(12) United States Patent
Shen et al.

(10) Patent No.: US 11,144,586 B2
(45) Date of Patent: Oct. 12, 2021

(54) FILE KINSHIP FOR MULTIMEDIA DATA TRACKING

(71) Applicant: Microsoft Technology Licensing, LLC, Redmond, WA (US)

(72) Inventors: Guobin Shen, Beijing (CN); Songwu Lu, Los Angeles, CA (US); Fan Yang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 685 days.

(21) Appl. No.: 15/269,775

(22) Filed: Sep. 19, 2016

(65) Prior Publication Data

US 2017/0011032 A1 Jan. 12, 2017

Related U.S. Application Data

(63) Continuation of application No. 12/950,866, filed on Nov. 19, 2010, now Pat. No. 9,449,024.

(51) Int. Cl.
| | |
|---|---|
| *G06F 16/51* | (2019.01) |
| *G06F 16/58* | (2019.01) |
| *G06F 16/583* | (2019.01) |
| *G06K 9/46* | (2006.01) |
| *H04L 29/08* | (2006.01) |

(52) U.S. Cl.
CPC .............. *G06F 16/51* (2019.01); *G06F 16/58* (2019.01); *G06F 16/583* (2019.01); *G06F 16/5838* (2019.01); *G06K 9/4652* (2013.01); *H04L 67/10* (2013.01)

(58) Field of Classification Search
CPC .... G06F 16/51; G06F 16/5838; G06F 16/583; G06F 17/30247; G06F 17/30256
See application file for complete search history.

(56) References Cited

U.S. PATENT DOCUMENTS

| | | | |
|---|---|---|---|
| 6,990,628 B1 | 1/2006 | Palmer et al. | |
| 7,164,797 B2 | 1/2007 | Simard et al. | |
| 7,379,875 B2 | 5/2008 | Burges et al. | |
| 7,403,951 B2 | 7/2008 | Setlur et al. | |
| 7,421,305 B2 | 9/2008 | Burges et al. | |
| 7,472,122 B2 | 12/2008 | Ishida et al. | |
| 7,490,116 B2 * | 2/2009 | Carson | G06F 17/30011 |
| 7,693,859 B2 | 4/2010 | Borthakur et al. | |
| 7,966,327 B2 | 6/2011 | Li et al. | |
| 8,086,548 B2 * | 12/2011 | Brdiczka | G06F 17/3061 |
| | | | 706/12 |
| 8,442,321 B1 | 5/2013 | Chang et al. | |

(Continued)

OTHER PUBLICATIONS

Anand, et al., "Tracking Semantic Relationships for Effective Data Management in Home Networks", retrieved on Aug. 2, 2010 at <<http://pages.cs.wisc.edu/~akella/papers/homenets2010.pdf>>, ACM, SIGCOMM HomeNets Workshop, New Delhi, India, Sep. 2010, pp. 1-5.

(Continued)

*Primary Examiner* — Vaishali Shah
(74) *Attorney, Agent, or Firm* — Schwegman Lundberg & Woessner, P.A.

(57) ABSTRACT

Kinship between electronic files among personal networked devices may be ascertained between the files by determining an operational relationship between the files and with a similarity measurement.

19 Claims, 7 Drawing Sheets

(56) References Cited

U.S. PATENT DOCUMENTS

| | | | |
|---|---|---|---|
| 2002/0169667 A1* | 11/2002 | Marotta | G06Q 30/02 705/14.4 |
| 2003/0033300 A1 | 2/2003 | Bergman et al. | |
| 2005/0097120 A1 | 5/2005 | Cooper et al. | |
| 2005/0210248 A1 | 9/2005 | Graveman | |
| 2007/0003165 A1* | 1/2007 | Sibiryakov | G06K 9/6211 382/294 |
| 2007/0162521 A1* | 7/2007 | Raghunath | G06F 9/44563 |
| 2007/0214418 A1* | 9/2007 | Wang | G06K 9/00751 715/726 |
| 2007/0239756 A1* | 10/2007 | Li | G06F 17/30864 |
| 2008/0080017 A1 | 4/2008 | Ishizuka et al. | |
| 2008/0273220 A1* | 11/2008 | Couchman | H04N 1/00209 358/1.15 |
| 2009/0049108 A1 | 2/2009 | Forde et al. | |
| 2009/0198677 A1 | 8/2009 | Sheehy et al. | |
| 2009/0198744 A1 | 8/2009 | Nakamura | |
| 2010/0007758 A1* | 1/2010 | Abe | G06K 9/6202 348/222.1 |
| 2010/0010944 A1 | 1/2010 | Cheng et al. | |
| 2011/0173334 A1* | 7/2011 | Shah | H04L 67/141 709/228 |
| 2011/0249872 A1* | 10/2011 | Monro | G06K 9/0061 382/117 |
| 2012/0008821 A1 | 1/2012 | Sharon et al. | |
| 2013/0120438 A1* | 5/2013 | Shechtman | G06T 11/60 345/611 |
| 2014/0223309 A1 | 8/2014 | Boiman et al. | |

OTHER PUBLICATIONS

Burges, et al., "Distortion Discriminant Analysis for Audio Fingerprinting", retrieved on Aug. 2, 2010 at <<http://citeseerx.ist.psu.edu/viewdoc/download;jsessionid=7E5BD9E5F8036826F6C549A96EF13946?doi=10.1.1.24.6259&rep=rep1&type=pdf>>, Microsoft Corporation, Microsoft Research, Technical Report MSR-TR-2001-116, Dec. 2001, pp. 1-16.

"CIFS (Common Internet File System) Protocol", retrieved on Aug. 2, 2010 at <<http://msdn.microsoft.com/enus/library/aa302188.aspx>>, Microsoft Corporation, 2010, pp. 1.

"CVS—Concurrent Versions System", retrieved on Aug. 2, 2010 at <<http://www.nongnu.org/cvs/>>, Derek Robert Price, Ximbiot and Free Software Foundation, Inc., Dec. 3, 2006, pp. 1-2.

Do et al., "COMA—A system for flexible combination of schema matching approaches", Proceedings of the 28th VLDB Conference, Hong Kong, China, 2002, pp. 1-pp. 12.

"File Management Functions", retrieved on Aug. 2, 2010 at <<http://msdn.microsoft.com/enus/library/aa364232(VS.85).aspx>>, Microsoft Corporation, Jul. 29 2010, pp. 1-8.

"FileMon for Windows v7.04", retrieved on Aug. 2, 2010 at <<http://technet.microsoft.com/enus/sysinternals/bb896642.aspx>>, Microsoft Corporation, Microsoft TechNet, 2010, pp. 1.

Gifford, et al., "Semantic File Systems", retrieved on Aug. 2, 2010 at <<http://web.mit.edu/6.826/www/notes/HO13.pdf>>, ACM, Proceedings of Symposium on Operating Systems Principles, Oct. 1991, pp. 16-25.

Manku et al., "Detecting Near-Duplicates for Web Crawling", World Wide Web Conference Committee, 2007, 9 pages.

Muniswamy-Reddy, et al., "Provenance-Aware Storage Systems", retrieved on Aug. 2, 2010 at <<http://www.eecs.harvard.edu/~kiran/pubs/pass-usenix06.pdf>>, USENIX Association, Proceedings of Annual Technical Conference, Boston, MA, 2006, pp. 1-14.

Muthitacharoen, et al., "A Low-bandwidth Network File System", retrieved on Aug. 2, 2010 at <<http://citeseerx.ist.psu.edu/viewdoc/download;jsessionid=44103F3BC089F3F3AAB2771BD6E13B6F?doi=10.1.1.10.8444&rep=rep1&type=pdf>>, ACM, Proceedings of Symposium on Operating Systems Principles, Banff, Canada, 2001, pp. 174-187.

Office action for U.S. Appl. No. 12/950,866, dated Jun. 15, 2012, Shen et al., "File Kinship for Multimedia Data Tracking", 15 pages.

Office action for U.S. Appl. No. 12/950,866, dated Oct. 9, 2015, Shen et al., "File Kinship for Multimedia Data Tracking", 22 pages.

Office action for U.S. Appl. No. 12/950,866, dated Feb. 27, 2015, Shen et al., "File Kinship for Multimedia Data Tracking", 18 pages.

Office action for U.S. Appl. No. 12/950,866, dated Mar. 14, 2013, Shen et al., "File Kinship for Multimedia Data Tracking", 21 pages.

Peek, et al., "EnsemBlue: Integrating Distributed Storage and Consumer Electronics", retrieved on Aug. 2, 2010 at <<http://www.google.co.in/url?sa=t&source=web&cd=1&ved=0CBUQFjAA&url=http%3A%2F%2Fwww.cs.ubc.ca%2Flabs%2Fdsg%2FSem_Winter_2007%2Fensemblue.pdf&ei=nH1WTNqVLpKB4AaspbynBQ&usg=AFQjCNH3V9MLGh9fQpFjzFqAkgdFtg0fvw>>, ACM, Proceedings of Symposium on Operating Systems Design and Implementation (OSDI), Seattle, WA, Nov. 2006, pp. 1-14.

Pinola, "How to Sync Your Data Across Multiple Devices", retrieved on Aug. 2, 2010 at <<http://mobileoffice.about.com/od/softwarewebapps/a/sync-multiple-devices.htm>>, The New York Times Company, About.com Mobile Office Technology, 2010, pp. 1-2.

Quinlan, et al., "Venti: a new approach to archival storage", retrieved on Aug. 2, 2010 at <<http://lsub.org/sys/doc/venti/venti.pdf>>, USENIX Association, Proceedings of the Conference on File and Storage Technologies (FAST), Berkeley, CA, Jan. 2002, pp. 89-101.

Sar, et al., "Lineage File System", retrieved on Aug. 2, 2010 at <<http://www.google.co.in/url?sa=t&source=web&cd=2&ved=0CBkQFjAB&url=http%3A%2F%2Ftheory.stanford.edu%2F~cao%2Flineage-fs.ps&rct=j&q=Lineage%20file%20system&ei=AoIWTNOSO5Clcbf7icAM&usg=AFQjCNEMRScXhydBQVHCUr7d35T7KrhSTg>>, 2005, pp. 1-6.

Shah, et al., "Using Provenance to Aid in Personal File Search", retrieved on Aug. 2, 2010 at <<http://www.hpl.hp.com/personal/Craig_Soules/papers/usenix07.pdf>>, USENIX Association, Proceedings of Technical Conference, Santa Clara, CA, Article 13, 2007, pp. 1-14.

Soules, et al., "Connections: Using Context to Enhance File Search", retrieved on Aug. 2, 2010 at <<http://www.pdl.cmu.edu/PDL-FTP/ABN/soules-sosp05.pdf>>, ACM, Proceedings of Symposium on Operating Systems Principles (SOSP), Brighton, United Kingdom, Oct. 2005, pp. 1-14.

"SQLite", retrieved on Aug. 2, 2010 at <<http://www.sqlite.org/>>, 2010, pp. 1-2.

Veeraraghavan, et al., "quFiles: a unifying abstraction for mobile data management", retrieved on Aug. 2, 2010 at <<http://citeseerx.ist.psu.edu/viewdoc/download?doi=10.1.1.92.258&rep=rep1&type=pdf>>, ACM, Proceedings of Workshop on Mobile Computing Systems and Applications, Napa Valley, California, 2008, pp. 65-68.

Wang, et al., "Large-Scale Duplicate Detection for Web Image Search", retrieved on Aug. 2, 2010 at <<http://www.cecs.uci.edu/~papers/icme06/pdfs/0000353.pdf>>, IEEE, Proceedings of International Conference on Multimedia and Expo (ICME), 2006, pp. 353-356.

Office action for U.S. Appl. No. 12/950,866, dated Oct. 8, 2014, Shen et al., "File Kinship for Multimedia Data Tracking", 18 pages.

* cited by examiner

FILE KINSHIP FOR MULTIMEDIA DATA TRACKING

CROSS REFERENCE TO RELATED APPLICATIONS

This patent application is a continuation application of co-pending, commonly owned U.S. patent application Ser. No. 12/950,866, entitled "File Kinship for Multimedia Data Tracking", filed on Nov. 19, 2010, which is incorporated herein by reference.

BACKGROUND

Today people usually possess multiple computing devices, including home servers, personal computers, personal digital assistants (PDA), portable gaming systems, and mobile phones. With the possibility of multiple computing devices, it becomes ever easier to create multimedia content, such as by taking photos with digital cameras. Also, people often produce multiple versions of the same content to better serve different purposes. Further, different versions of the content may flow to different targets (devices, folders, or documents). However, as time goes by and content accumulates, one can easily lose track of which versions of what content are on different targets.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present disclosure describes determining kinship between electronic files among a network of multiple personal devices. Many specific details are set forth in the following description and in FIGS. 1-7 to provide a thorough understanding of various implementations. One skilled in the art will understand, however, that the subject matter described herein may have additional implementations, or that the concepts set forth may be practiced without several of the details described in the following description.

Figure 1:
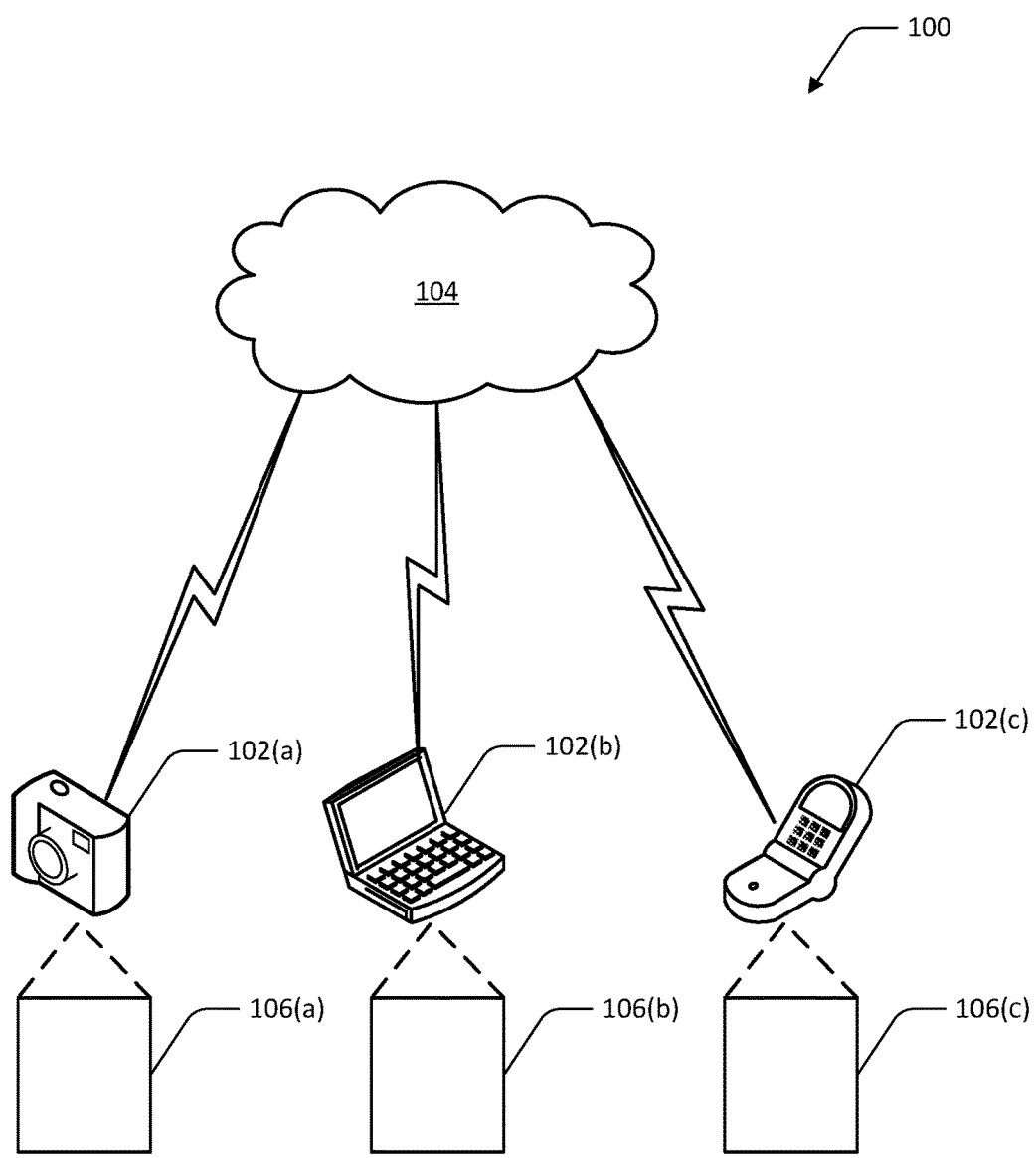
FIG. 1 is a block diagram illustrating an example environment comprising multiple devices coupled together via a network. The devices store files that are related in some way and have a kinship relationship.

FIG. 1 shows an example environment 100 comprising a plurality of devices 102 coupled together via a network 104. Environment 100 may comprise any number of devices 102. These devices 102 may comprise any type of personal network device. As shown, environment 100 comprises a digital camera 102(*a*), a personal computer 102(*b*), and a smartphone 102(*c*). However, devices 102 may also comprise home servers, personal computers, personal digital assistants, gaming devices, mobile phones, media players, netbooks, and so forth. A network 104 may include a wireless interface, and/or a wired interface such as the Internet, in addition to local area networks (LANs), wide area networks (WANs), direct connections, such as through a universal serial bus (USB) port, exchange of computer-readable media, or any combination thereof. Devices 102 are able to share information between each other as a result of being coupled together via network 104. A file stored on digital camera 102(*a*) may be shared with personal computer 102(*b*) and further smartphone 102(*c*) may share a file stored thereon with digital camera 102(*a*). In an example, digital camera 102(*a*) captures an image (e.g. a digital photograph) and stores the image as a file 106 on an internal memory thereof. In a further implementation, each device 102 comprises any number of files 106, at least some of which may be related to files on another of the devices, the relationship defining a kinship relationship between the files.

Figure 2A:
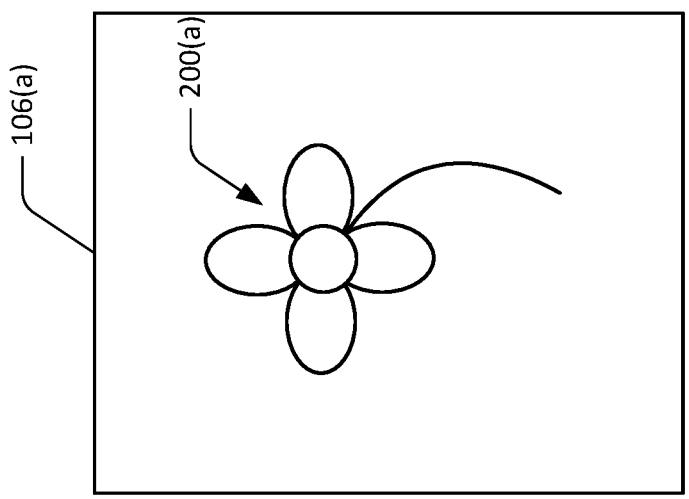
FIGS. 2a-2c are block diagrams illustrating an example of a plurality of related files, each file comprising an image.
Figure 2B:
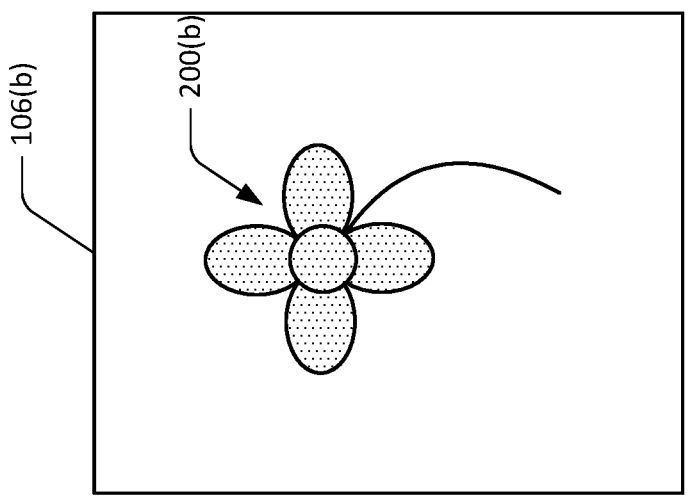
Figure 2C:
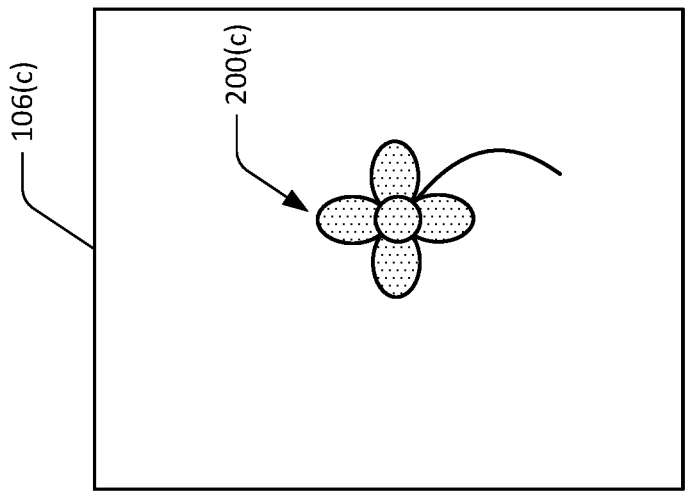

FIG. 2(*a*) shows file 106(*a*) comprising an image 200(*a*). Digital camera 102(*a*) transfers a copy of file 106(*a*) to personal computer 102(*b*) via network 104, forming file 106(*b*) on personal computer 102(*b*). Personal computer 102(*b*) may then alter image 200(*a*) of file 106(*b*), defining image 200(*b*) on file 106(*b*), shown in FIG. 2(*b*), with image 200(*b*) comprising an alteration to a shading of image 200(*a*). However, the alteration may be any change desired by the user (e.g. shading, cropping, red eye reduction, compression, or any other editing or modification). Personal computer 102(*b*) may then transfer a copy of file 106(*b*) to smart phone 102(*c*) via network 104, defining file 106(*c*) on smart phone 102(*c*). During the transfer to smart phone 102(*c*), a resolution of image 200(*b*) may be reduced such that it is properly displayed upon a display of smart phone 102(*c*), defining image 200(*c*) of file 106(*c*). Thus, there are three files 106(*a*), 106(*b*), and 106(*c*) comprising similar images 200(*a*), 200(*b*), and 200(*c*), respectively, with images 200 depicting a similar scene (the flower). By having similar scenes, files 106(*a*), 106(*b*), and 106(*c*) may have a file kinship relationship. To that end, it may be desirable to track the kinship relationship of files 106 and further, to track the kinship relationship of files 106 across multiple devices 102.

To determine the kinship between files 106, both an operational relationship and a similarity are determined between files 106. The operational relationship between files 106 may be inferred from the system operations of devices 102. Specifically, system operations such as higher level operational commands between files 106 are observed. The higher level commands include, but are not limited to, "save as," "copy," and "move." The higher level commands typically comprise multiple low level file system calls and responses for each operational command. Thus, by pattern matching the low level file system calls, the higher level commands may be observed, thus establishing an operational relationship between files 106, wherein files 106 may be now designated as related files 106. The low level file system calls include, but are not limited to, "open," "create," and "close". Observing the file operational commands between the files 106 also facilitates local file operations (when the files 106 are stored on a single device 102) and remote file access (when the files 106 are stored on one or more of the devices 102).

Further, after determining the operational relationship, the similarity between files 106 is determined when files 106 have a similarity, or strength of kinship, greater than tunable parameter τ. Tunable parameter τ is set by a user. To determine the similarity between files 106, the strength of kinship between files 106 is quantified. The strength of kinship may be quantified via bit-level analysis, content level analysis, or both.

Bit-level analysis of files 106 comprises obtaining a bit-level similarity of files 106. Files 106, regardless of the contents thereof, are treated as bit streams and a bit-level similarity is obtained by counting the number of bits in common between any two or more of files 106. Specifically, files 106 are segmented into non-overlapping, variable sized chunks that can tolerate a shifting effect, such as insertion or deletion of a single byte, with the chunk boundaries based on file contents. Therefore, insertions and deletions of bits into the chunks only affect the surrounding chunks. Duplicated chunks between files 106 are then identified, and a bit-level similarity is obtained by determining a percentage of duplicated chunks between files 106 normalized against a file length of one of the files 106.

Content level analysis of files 106 comprises obtaining a content level similarity of files 106. For example, where files 106 are associated with audio contents (e.g. an "audio file"), audio fingerprinting techniques are applied. Specifically, an audio fingerprint is a condensed digital summary, such as a low-dimension feature vector. A distortion discriminant analysis (DDA) may be employed to segment the audio file into a series of fixed interval (e.g., 186 milliseconds) segments called frames. Each frame of data is processed (such as with fast fourier transform (FFT) and equalization) and converted to a 64-dimension vector using oriented principal component analysis (OPCA). Another layer of OPCA may then be applied to the vector in a sliding window fashion (with the window length equal to 32 frames) to obtain the final 64-dimension fingerprint for that window. Thus, to determine an audio content level similarity, the Euclidean distance between the features is calculated and the distance is normalized to a range of [0,1] with an effective exponential function (NEF) $y=e^{(-\lambda d)}$, with λ being a tunable parameter. In one implementation, λ is set to 1/8000.

Furthermore, where files 106 are associated with image content (e.g. "an image file"), a feature vector of the image file may be extracted as a k-bit hash code. The hash code may be obtained by first uniformly dividing the image into k (e.g. k=8×8) subimages and the average luminance of the sub-images may be calculated. Then, each sub-image is quantified to a binary bit by comparing its luminance against the average luminance. Thus, the k-bit hash code is generated. The k-bit feature vectors of the image file are obtained by measuring an image content similarity by the equation $$1 - \frac{d}{k},$$

wherein d is the Hamming distance between feature vectors of different image files. The above method is capable of handling most common image edits, including, but not limited to, scaling/resizing, color conversion, exposure adjustment, and rotation (between landscape and portrait orientations).

However, by applying two differing similarity analyses to files 106, two differing strengths of kinship may be obtained, a bit-level strength of kinship and a content level strength of kinship. In an example, files 106 have differing bit-level strength of kinship and content level strength of kinship. For example, under transcoding cases, the content level strength of kinship may be 1.0, but the bit-level strength of kinship may be 0. To that end, in one example, the maximum of the bit-level strength of kinship or the content level strength of kinship may be used as the final strength of kinship.

In some embodiments, after establishing that files 106 have an operational relationship and before quantifying the kinship, metadata filtering of the files 106 may be employed. Metadata filtering of files 106 reduces a number of "candidate" files that will have the strength of kinship (similarity) analysis applied thereto, thus saving computational resources of devices 102. In a further implementation, the metadata filtering may be done concurrently with the observing of the operational commands (pattern matching) mentioned above. The metadata of files 106 is examined and filtered such that a subset of files 106 comprises similar types of content, e.g., files that are unlikely to have kinship are excluded from the files 106. For example, spreadsheet files do not comprise similar content to image files. Specifically, when kinship of a first file 106(1) is being determined with respect to remaining files 106, remaining files 106 having differing extensions (.jpg, .dll, .exe) from first file 106(1) may be removed from considerations of kinship with first file 106(1), and thus be excluded from the similarity analysis.

Further metadata filtering includes, but is not limited to, excluding a subset of files 106 relating to system processes that access the disk frequently but are rarely related to user data, operations on multiple file types (that are of no interest to multimedia file kinship), and access to system folders.

After quantifying the strength of kinship between files 106, the strength of kinship is compared against the tunable parameter τ. If the strength of kinship is greater than or equal to τ, then kinship is established between files 106. However, if the strength of kinship is less than τ, kinship is not established between files 106. Tunable parameter τ is a user defined value, and thus, can be adjusted from 0 to 1, depending on the level of similarity desired by the user. For example, if file 106(1) has strength of kinship of 1 with respect to file 106(2), file 106(1) is an identical copy of file 106(2).

Figure 3:
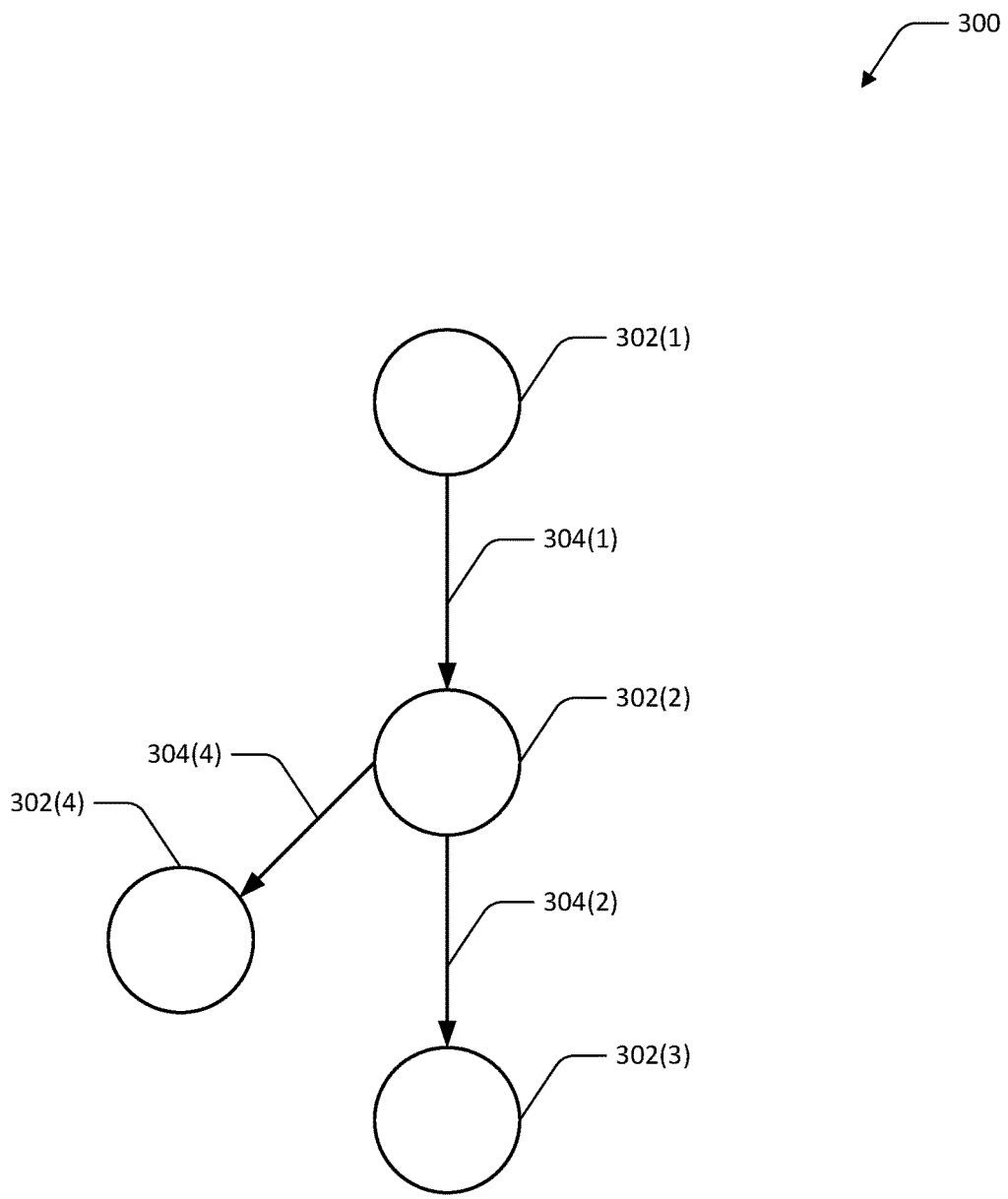
FIG. 3 is a block diagram illustrating an example of a kinship directed graph.

After establishing kinship between files 106, a kinship directed graph (KDG) may be created representing the file kinship between files 106. FIG. 3 shows an example of KDG 300. In KDG 300, each node 302 represents a file 106. The nodes 302 comprise metadata of the files 106 including, but not limited to, filename, location (either a local directory of the device 102 or the network path of the other devices 102), and timestamp. Connecting the nodes 302 to one another are links 304 representing the kinship relation between nodes 302 (files 106). Links 304 have at least three properties including similarity, direction (i.e., the derivation relation, who is derived from whom), and the operation that generates link 304. After determining the kinship between files 106, mentioned above, any updates to the kinship (and KDG 300) is propagated within each device 102 and between devices 102. The updates may comprise new files being introduced to system 100 or modification of existing kinship links between files 106.

For propagating kinship updates within each device 102 (local kinship update), first any new kinship with other files 106 that are previously within the kinship graph is captured.

Second, the existing kinship links are re-evaluated if the files 106 have been modified. In a further implementation, a file 106(3) may be deleted to propagate kinship updates within each device 102. If the deleted file 106(3) has kinship with respect to remaining files 106, then file 106(3) will be marked as a 'ghost' node 302 on KDG 300 and will remain in KDG 300. This facilitates avoiding partitioning of KDG 300 and hence preserves a potential kinship among related files 106 to deleted file 106(3). Further, it minimizes the operation overhead for file deletion. However, if the user intends to completely remove the node (file 106(3)), the ghost node will be deleted from KDG 300 as well. In this occurrence, all the associated kinship links to deleted file 106(3) will be removed and a repair of KDG 300 will be attempted, unless deleted file 106(3) is related to a sink node 302. Specifically, if there exists a node 302 with identical content among its parents or children, all of links 304 to that node 302 will be reincarnated. Otherwise, parents and children of node 302 will be reconnected by inheriting the link direction and re-evaluating the pair-wise similarities among them to avoid partitioning KDG 300 and hence preserve the potential kinship among files 106.

Figure 4A:
FIGS. 4a-4d are block diagrams illustrating example kinship propagation schemes.
Figure 4B:
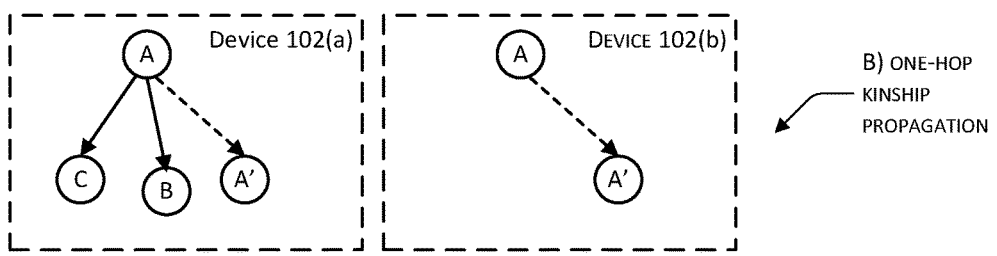
Figure 4C:
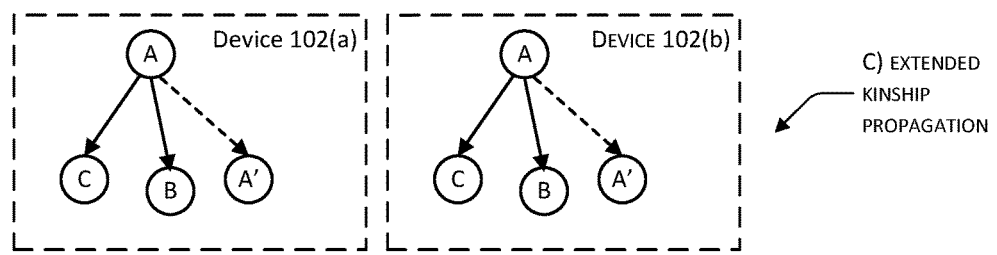
Figure 4D:
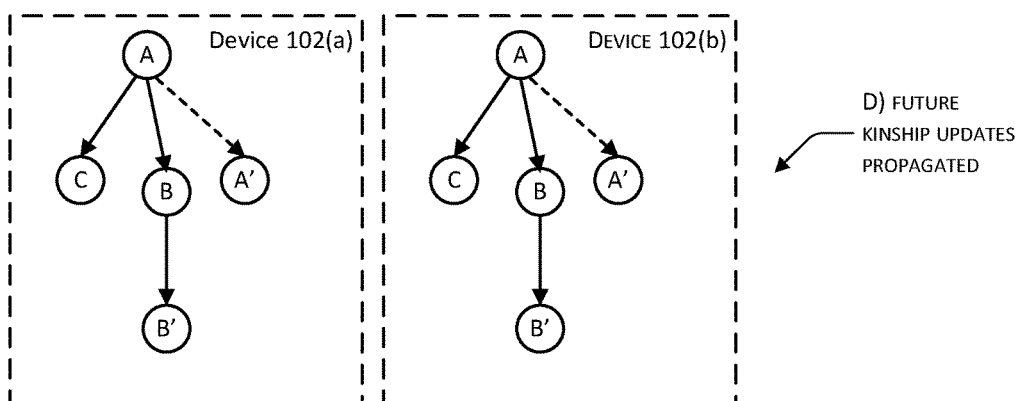

For propagating kinship updates across devices 102, a cross-device kinship update is employed. Specifically, in one implementation, each device 102 maintains a full kinship view only for all its local files 106. Thus, this is a partial view of the network wide kinship because each single device 102 only contains a portion of all files 106. Moreover, for files 106 copied between devices 102, there may also be choices in capturing and updating kinship, depending on how far the kinship data propagates. A first choice is one-hop propagation, that is, only file 106 being copied between devices 102 is introduced in the kinship. Any updates other than that file 106 will not be propagated. The second choice is extended propagation such that when file 106 is copied between devices 102, its kinship to other files 106 (not necessarily also copied) also propagates to the target device 102. Future updates to its kinship (not necessarily updates on itself) will be propagated as well. FIG. 4 shows the various kinship propagation schemes. Suppose device 102(a) has three files 106(4), 106(5), and 106(6), shown as nodes A, B, and C, respectively, with kinship relation as shown in FIG. 4(a). FIGS. 4(b) and 4(c) show the resulting kinship graphs on both devices 102(a) and 102(b) after file 106(4) is copied (shown as A' or B') to device 102(b) for one-hop and extended propagation schemes. The extended propagation scheme ensures consistent kinship views on different devices 102. This is depicted in FIG. 4(d). This consistent view enables network wide kinship navigation, but may cost more to propagate kinship updates. It is a design tradeoff between the convenience (wider availability of kinship data) and the system complexity.

During the local update mentioned above, all kinship updates outgoing to other devices 102 are marked and queued when devices 102 are disconnected. A connection is then established between devices 102, for example, between device 102(a) and device 102(b). Files 106 in common between the connected devices 102 (device 102(a) and 102(b)) are determined to define common files. Thereafter, any updates to the kinship of device 102(b) are propagated and merged for the common files based on the aforementioned kinship updates from device 102(a). Further, any updates to the kinship of device 102(a) are propagated and merged for the common files based on the aforementioned kinship updates from device 102(b).

For property updates to links 304, the updates are propagated to replace or update the previous links 304. For node property updates, three scenarios are differentiated. For new files 106 being copied, when a file 106 is copied from one device 102 (e.g. device 102(a)) to another device (e.g. device 102(b)), device 102(a) will first update its own KDG 300 by inserting a new node 302 corresponding to the file 106 on device 102(b) and the corresponding cross-device link. Device 102(a) will then send, for the common files, the updated kinship graph to device 102(b). The feature set of the file 106 is also sent to facilitate future kinship measurement on device 102(b). Note that the feature sets of other files 106 on device 102(a) are not sent.

For existing files updates, either device 102(a) or 102(b) or both may modify a subset of files 106 belonging to the same KDG 300. If the modification is made on non-boundary nodes 302 of the KDG (i.e., nodes 302 other than the two ends of a cross-device kinship link 304), the updates will be sent to the other device 102 and merged accordingly. If one of the boundary nodes 302 is modified, then device 102 will extract the new feature set and send it to the other device 104 for the strength of kinship (similarity) analysis. After employing the strength of kinship (similarity) analysis, the other devices 102 will update their respective KDG 300 by altering the strength of kinship (similarity) value. This update also triggers new link 304 property updates that will propagate back to device 102 and replace the old values. Simultaneous update of both boundary nodes 302 is analogous to that mentioned above except that both devices 102 need to extract new feature sets. However, it may incur redundant similarity tests and link 304 updates. This can be solved using timestamps to select the most recent to dictate the similarity test and link update.

For deletion of existing files, when files 106 corresponding to non-boundary nodes 302 of the KDG are deleted on one device 102, the resulting kinship updates are propagated to the other devices 102. If a boundary node 302 is deleted, it is marked as ghost. However, if a boundary node 302 is to be removed from the KDG 300, the cross-device kinship link will be deleted. The feature sets of all children of the boundary node 302 will be sent to the other device, which will in turn re-evaluate the similarity against the other boundary node. The kinship link(s) is thus reestablished and its direction is inherited from the deleted link. If the two boundary nodes are removed simultaneously, the cross-device link is deleted and the kinship graph is not repaired.

As mentioned, above, once files 106 are determined to have a kinship relationship between each other, information associated with one or more of files 106 may be propagated to all remaining files 106 having kinship thereto. In an example, a user has associated a plurality of tags associated with file 106(7). Upon copying file 106(7) between devices 102, it is desired to have the plurality of tags associated with file 106(7) propagate to remaining files 106 having kinship thereto across devices 102. Establishing kinship between files 106 automatically propagates tags between files 106. Further information that may be propagated includes ranks of files 106.

In a further implementation, determining kinship of files 106 is delegated to an additional computer. As mentioned above, device 102(c) is a smartphone, a low profile device, and device 102(b) is a personal computer, a more powerful device. Thus, device 102(b) has superior computing and power resources compared to device 102(c). To determine the kinship between files 106 stored on device 102(c), as a result of device 102(b) having superior computing and power processing recourse, device 102(c) may delegate determining the kinship of files 106 on the device 102(c) to device 102(b). A delegant/delegatee relationship will be established between devices 102(c) and 102(b).

In a further implementation, consistency between files 106 may either be strong or weak. Strong consistency requires immediate kinship updates whenever files 106 are modified. This may result in a larger amount of computational overhead to evaluate the strength of kinship (similarity). Weak consistency updates file kinship when devices 102 are idle or not in a power sensitive mode (e.g. laptop on external power). Thus, it may be desired to have a weak consistency between files 106 to conserve power resources.

In a further implementation, system 100 may further provide Application Programming Interfaces (API). A kinshipExplorer API may retrieve and (optionally) visualize the KDG of the files 106. A TagAll API may be used to propagate tags added from files 106 to other files 106 belonging to the same KDG.

In a further implementation, files 106 may have an asymmetrical strength of kinship, e.g., the strength of kinship of file 106 is interpreted from the standpoint of file 106 being examined. Specifically, file 106(8) has a first strength of kinship with respect to file 106(9) and file 106(9) has a second strength of kinship with respect to file 106(8), wherein the first and second strengths of kinship differ. In an example, file 106(8) is included in file 106(9), such as embedding multiple pictures into a power point presentation. From the perspective of file 106(8), the strength of kinship to file 106(9) is 1 as its information is completely included with file 106(9). However, from the perspective of file 106(9), the strength of kinship to file 106(8) is less than 1 since it also comprises other information in addition to file 106(8).

In a further implementation, establishing kinship between files 102 across devices 104 may facilitate smart selection, intelligent de-duplication, and data tracing. Smart selection is the ability, with all files 106 available to a user, to easily pick the most proper version, as determined by the user, of file 106 at the most proper device 102 for a certain purpose as determined by the user. For example, a user can readily select file 106 having an intermediate resolution for an online picture printing service. Intelligent de-duplication is the ability, with all files 106 available to the user, to selectively discard files 106 having the same content. In an example, the user can safely delete a subset of files 106 from digital camera 102(a) after copying the subset of files 106 to personal computer 102(b) to make memory space for additional images. Data tracing is the ability for the user to trace where specific content (files 106) goes on what devices 102 or is included in which documents. In an example, the user may trace pictures and identify text documents and presentations that the pictures are embedded in, as well as kinship of the pictures on devices 102.

Figure 5:
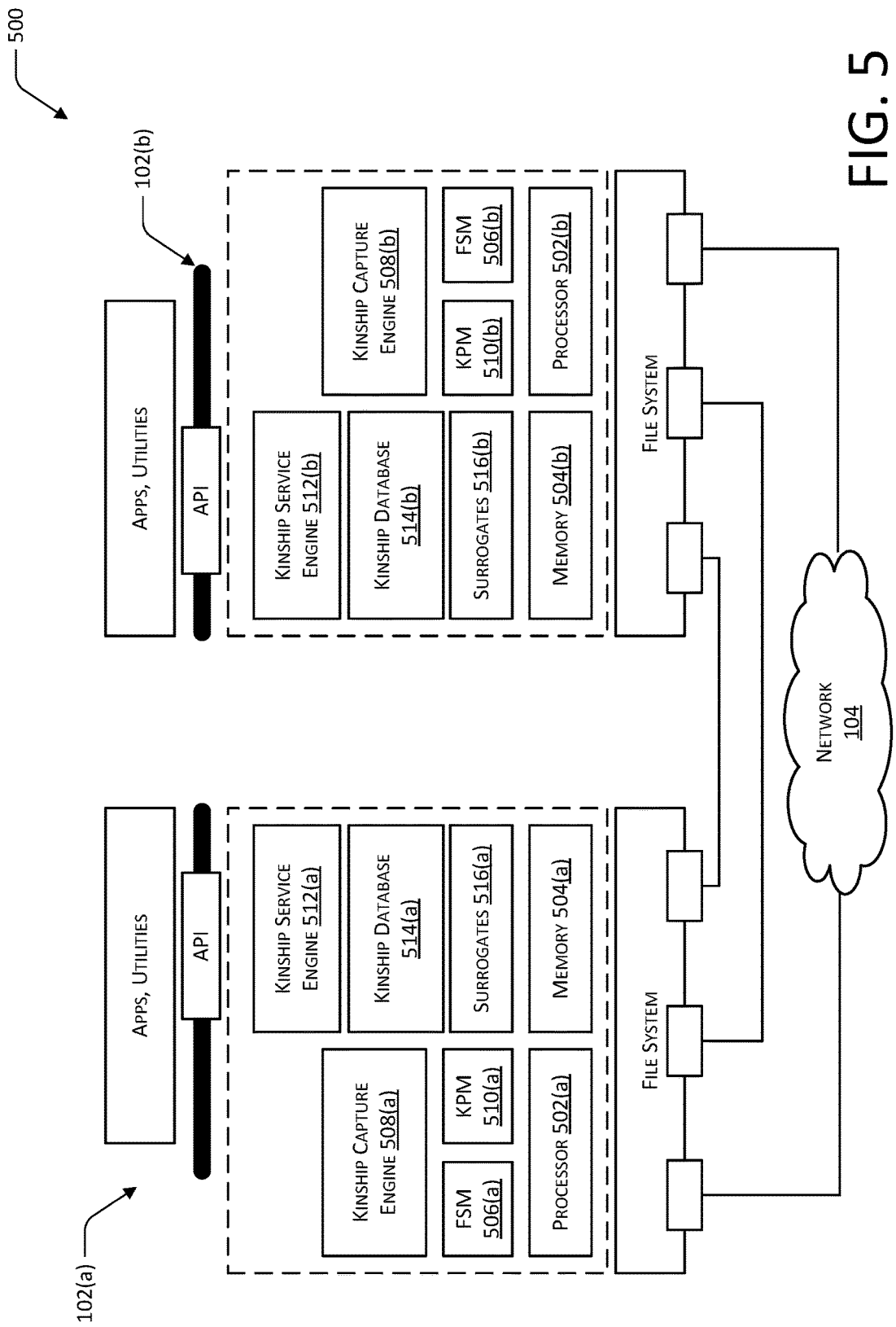
FIG. 5 is a block diagram illustrating an example system architecture for kinship tracking across a network of multiple personal devices.

FIG. 5 shows a system architecture 500 of kinship tracking across devices 102. System 500 comprises device 102(a) and device 102(b) coupled together via network 104. Devices 102 comprises a processor 502, a memory 504, a file system monitor (FSM) component 506, a kinship capture engine component 508, a kinship propagation monitor (KPM) component 510, a kinship service engine component 512, a kinship database component 514, and a repository surrogates component 516. The processor 502, memory 504, and components 506-516 are coupled together, such as via a bus (not shown).

The memory 504 may comprise computer-readable storage media (CRSM). The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

File system monitor component 506 monitors the operational commands between files 106 and feeds the detected operational commands to kinship capture engine component 508. The kinship capture engine component 508 tracks the local kinship updates and determines the operational relationship between files 506 based on the operational commands and identifies candidate files that may have potential kinship to define related files 106. The kinship capture engine component 508 then triggers a post verification process to quantify the strength of kinship between related files 106. This quantification may include applying the bit-level analysis and the content level analysis to related files 106 to established kinship between related files 106 based on the strength of kinship.

The kinship propagation manager component 510 monitors the networked kinship updates by monitoring the signal channel to other devices 102 (e.g. kinship propagation manager component 510(a) monitors the signal channel to device 102(b)) to maintain cross-device kinship. For example, if device 102 is disconnected from the system 500 (such as from a disconnect of network 104), updates to kinship across devices 102 will be queued locally and resume upon connection to system 500. Specifically, files 106 that are stored on device 102(a) may have kinship with files 106 stored on device 102(b). Thus, any updates to files 106 on device 102(a), such as tagging or ranking, will be propagated to files 106 on device 102(b) having kinship to files 106 on the device 102(a).

The kinship service engine component 512 processes commands, such as queries and manipulations, from third party applications (with respect to files 106) relating to the kinship between related files 106. For example, a photo editing application may query a file. The kinship database component 514 is employed to store data relating to the kinship of files 106 stored on respective devices 106. Thus, the kinship related data on each device 102 is a partial view of the total kinship across the plurality of devices 102. In an example, the kinship database component 514 is a Structured Query Language (SQL) database. In a further embodiment, similar to that mentioned above, device 102(a) may delegate determining the kinship of files stored on device 102(a) to device 102(b). The repository surrogates component 516(b) of device 102(b) maintains the surrogate of the delegants (device 102(a)) kinship data.

Several processes are described below, including those shown in FIGS. 6 and 7. These processes may be implemented in the architecture described herein, or in other architectures. These processes are illustrated as a collection of blocks in a logical flow graph, which represent a sequence of operations that can be implemented in hardware, software, or a combination thereof. In the context of software, the blocks represent computer-executable instructions that, when stored on CRSM and executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, and not by way limitation, the following processes are described with reference to the architectures of FIGS. 1-5.

Figure 6:
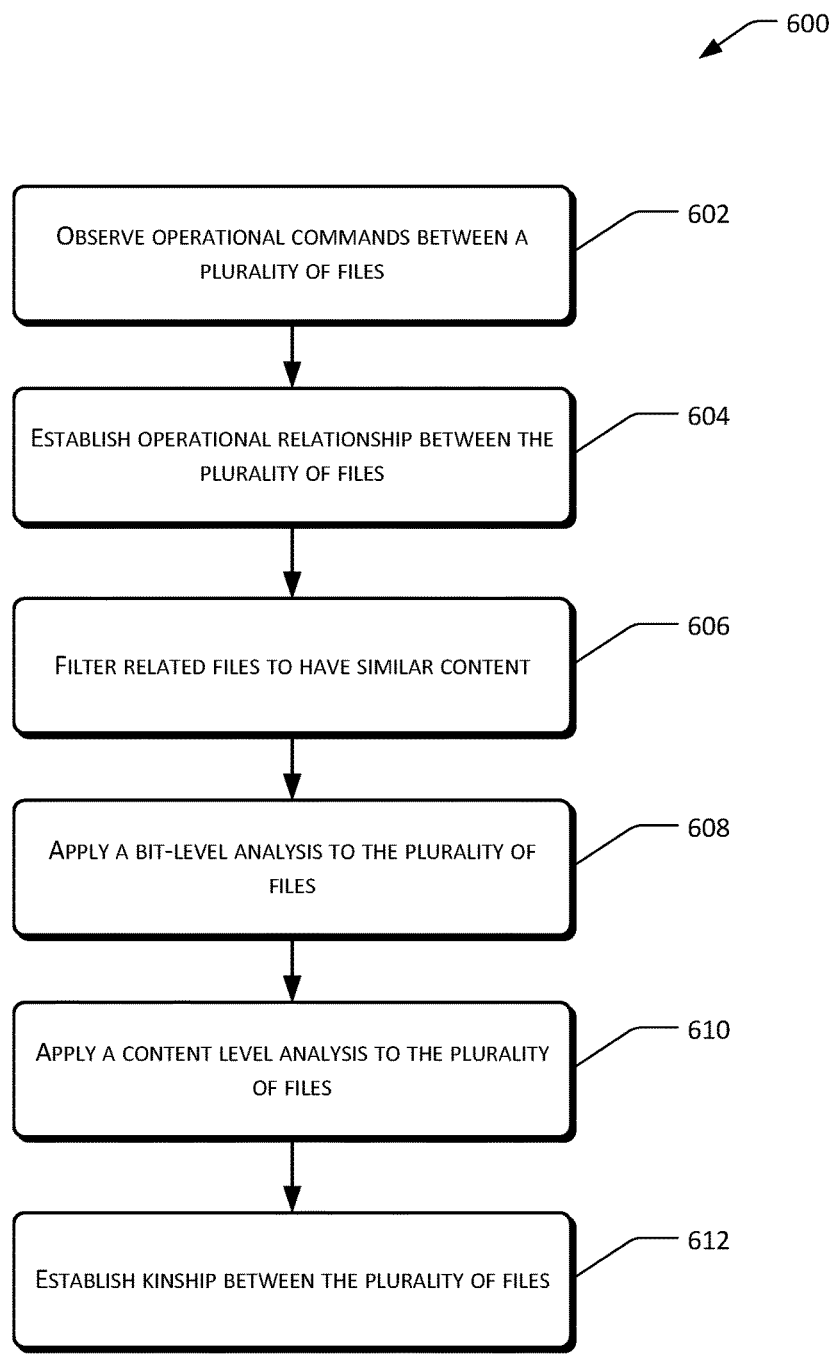
FIG. 6 is a flowchart of a process for determining kinship between files accessible by multiple personal networked devices.

FIG. 6 shows a process 600 of determining kinship between files 106 accessible by devices 102. This process may be stored on a memory and executed on a processor. At 602, operational commands between the files 106 are observed by pattern matching file system calls and responses for each operational command. At 604, an operational relationship between files 106 is established based on the observing to define related files 106. At 606, related files 106 are filtered such that related files 106 comprise files having similar types of content. At 608, a bit-level analysis is applied to related files 106 to obtain a bit level similarity. At 610, a content level analysis is applied to related files 106 to obtain a content level similarity.

The bit level analysis 608 and content level analysis 610 are shown in sequence; however in other implementations these operations may be performed in parallel. In another implementation the content level analysis 610 may be performed sequentially before the bit-level analysis 608. Additionally, in some implementations a single analysis such as the bit-level analysis 608 or the content level analysis 610 may be applied. The process may be configured such that results from the bit-level analysis 608 or content level analysis 610 determine when the next operation is performed. For example, the bit-level analysis 608 may be performed first, and when the similarity of the bit-level analysis 608 is less than 1.0, the content-level analysis 610 may be performed. Likewise, when the bit-level analysis 608 indicates a similarity of 1.0, the content-level analysis 610 may be omitted.

While the two similarity analysis processes of bit-level analysis 608 and content-level analysis 610 are described herein, it is understood that other analysis and operations may be used to determine kinship, including manual establishment of kinship. For example, in some implementations users may manually connect, disconnect, or otherwise adjust and modify the similarity between nodes within the KDG. At 612, a kinship is established between related files 106 based on the strength of kinship.

Figure 7:
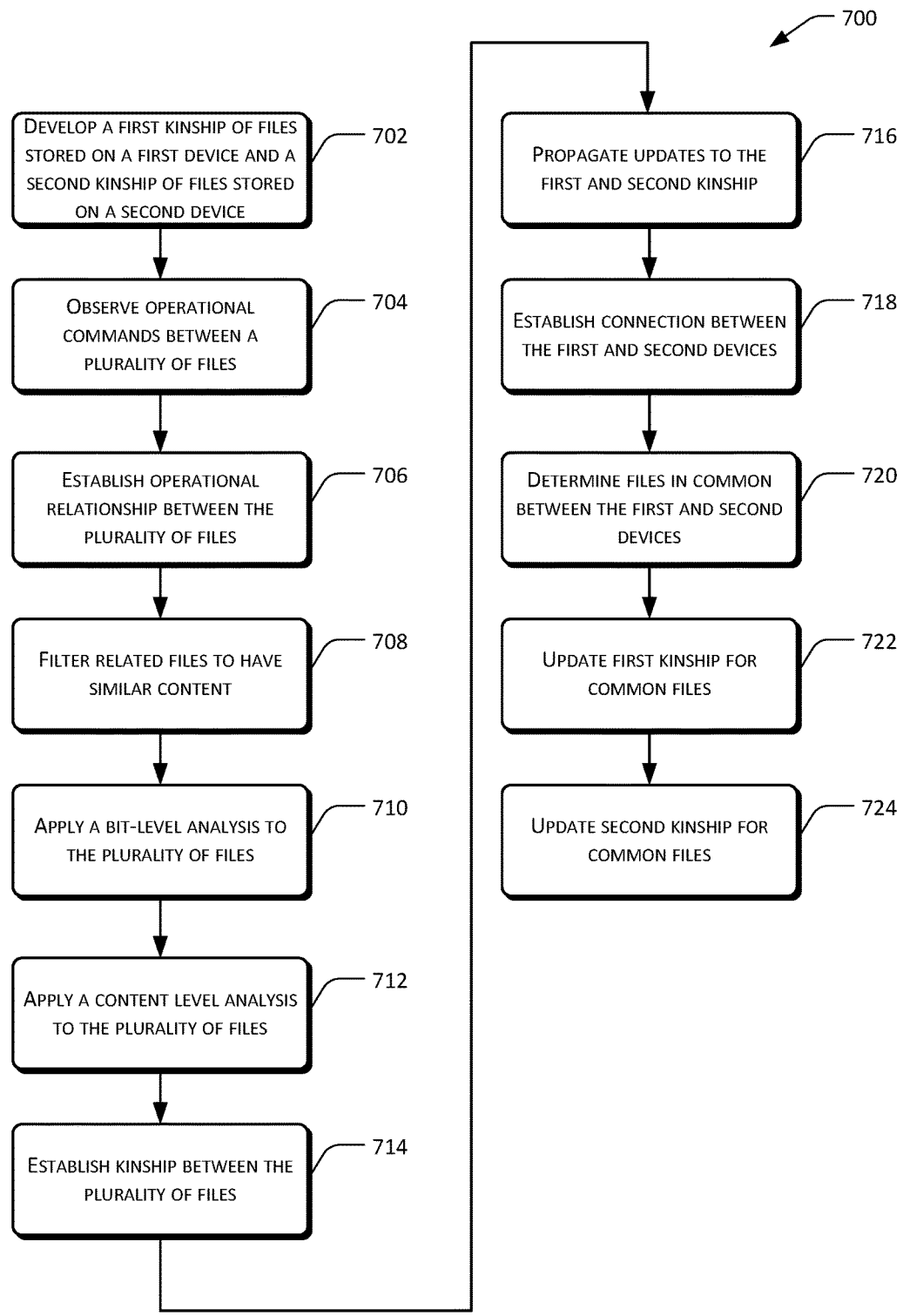
FIG. 7 is a flowchart of a process for determining kinship between files accessible by multiple personal networked devices and propagating updates between the devices.

FIG. 7 shows a further process 700 of determining kinship between files 106 accessible by devices 102 and propagating updates between device 102. This process may be stored on a memory and executed on a processor. At 702, on first device 106(a) and second device (b), developing a first kinship of files stored on first device 106(a) and a second kinship of files stored on second device 106(b), the developing comprising, at 704, observing operational commands between the files 106 by pattern matching file system calls and responses for each operational command. At 706, an operational relationship between files 106 is established based on the observing to define related files 106. At 708, related files 106 are filtered such that related files 106 comprise files having similar types of content. At 710, a bit-level analysis is applied to related files 106 to obtain a bit level similarity. At 712, a content level analysis is applied to related files 106 to obtain a content level similarity. As described above with regards to FIG. 6, in some implementations the content level analysis 712 may be performed in parallel with, or before the bit-level analysis 710. In other implementations either the bit level analysis 710 or the content level analysis 712 may be performed, or one may be conditional upon the other.

At 714, a kinship is established between related files 106 based on the strength of kinship. At 716, propagating updates to the first and second kinships, the propagating comprising, at 718, establishing a connection between first device 106(a) and second device 106(b). At 720, common files are determined from files in common between first device 106(a) and second device 106(b). At 722, updating the first kinship for the common files on first device 106(a) based on updates from second device 106(b). At 724, updating the second kinship for the common files on the second device based on updates from the first device.

CONCLUSION

Although embodiments for determining kinship between electronic files among a network of multiple personal devices have been described in language specific to structural features and/or methods, it is to be understood that the subject of the claims is not necessarily limited to the specific features or methods described. Rather, the specific features and methods are disclosed as exemplary implementations for determining kinship between electronic files among a network of multiple personal devices.

What is claimed is:
1. A method comprising:
performing operations under control of one or more processors, the operations including:
identifying related image files including a first image file and a second image file;
applying a bit-level analysis to the related image files to obtain a bit-level similarity between the first image file and the second image file, the bit-level similarity being a numerical measure of similarity, with the bit-level similarity, obtained without considering image content of the first image file and the second image file, by treating the first image file and the second image file as bit streams and counting a number of bits in common between the first image file and the second image file;
applying a content level analysis to the related image files to obtain a content level similarity between the first image file and the second image file, the content level analysis being a separate and different process from the bit-level analysis, with the content level similarity being a numerical measure of similarity, wherein applying the content level analysis includes extracting luminance-based feature vectors of the related image files;
quantifying a strength of kinship between the first image file of the related image files and the second image file of the related image files, wherein the strength of kinship is based, at least in part, on a comparison of the bit-level similarity to the content level similarity with the bit-level similarity and the content level similarity normalized with respect to a common numerical range;
establishing a kinship relationship between the first image file and the second image file based on the strength of kinship; and
performing an operation with regard to at least one of the first image file or the second image file, the performing of the operation based at least in part on the kinship relationship between the first image file and the second image file, the operation with regard to at least one of the first image file or the second image file comprises facilitating smart selection, facilitating intelligent de-duplication, or facilitating data tracing.

2. A method as recited in claim 1, wherein identifying the related image files comprises:
    observing operational commands between a plurality of image files by pattern matching file system calls and responses for the operational commands; and
    establishing an operational relationship between the plurality of image files based on the observing to define a plurality of related image files.

3. A method as recited in claim 2 wherein the operational commands include one or more of a save as, move, rename, copy, open, close, or delete command.

4. A method as recited in claim 1, wherein identifying the related image files comprises:
    identifying a plurality of potentially related image files; and
    filtering the plurality of potentially related image files based on metadata to identify the related image files.

5. A method as recited in claim 4, wherein the metadata includes a file extension.

6. A method as recited in claim 4, wherein filtering the plurality of potentially related image files includes identifying, as the related image files, files of the potentially related image files having similar types of content.

7. A method as recited in claim 1, wherein extracting luminance-based feature vectors of the related image files includes extracting binary k-bit feature vectors of the related image files as k-bit hash codes by:
    uniformly dividing each of the related image files into a number of k sub-images;
    calculating a luminance of each of the k sub-images;
    calculating an average luminance of the k sub-images; and
    quantifying each of the k sub-images to a binary bit by comparing the luminance of the sub-image to the average luminance; and
    measuring an image content similarity by determining a Hamming distance between the k-bit feature vectors, dividing the Hamming distance by the number of, k sub-images providing a result, and subtracting the result from 1.

8. A method as recited in claim 1, wherein establishing the kinship relationship between the first image file and the second image file includes establishing the kinship relationship in a kinship database.

9. A method as recited in claim 1, wherein establishing the kinship relationship between the first image file and the second image file includes establishing the kinship relationship between the related image files based, at least in part, on the strength of kinship being above a kinship threshold.

10. A method as recited in claim 1, wherein:
    the first image file has a first strength of kinship with respect to the second image file; and
    the second image file has a second strength of kinship with respect to the first image file, the first strength of kinship differing from the second strength of kinship.

11. A method as recited in claim 1, wherein the strength of kinship is based at least in part on a maximum of the bit-level similarity and the content level similarity.

12. A method as recited in claim 1, further comprising propagating information associated with the first image file or the second image file to remaining image files of the related image files having a strength of kinship above a kinship threshold.

13. A method as recited in claim 1, further comprising processing a command from a third party application relating to the kinship relationship between the related image files.

14. A method comprising:
    performing operations under control of one or more processors, the operations including:
    developing a first kinship of files stored on a first device and a second kinship of files stored on a second device, wherein developing the first kinship of files stored on the first device comprises:
    identifying a plurality of potentially related files stored on the first device, each of the potentially related files having image content;
    filtering the plurality of potentially related files based on metadata associated with individual files of the plurality of potentially related files to identify a plurality of related files stored on the first device;
    applying a bit-level analysis, on a pair-wise basis, to the plurality of related files to obtain a bit-level similarity for each pair of related files of the plurality of related files, the bit-level similarity being a numerical measure of similarity, with the bit-level similarity obtained without considering image content of the files of each pair, by treating the files of each pair as bit streams and counting a number of bits in common between the files of each pair;
    applying a content level analysis, on the pair-wise basis, to the plurality of related files to obtain a content level similarity for each pair of related files of the plurality of related files, the content level analysis being a separate and different process from the bit-level analysis, with the content level similarity being a numerical measure of similarity;
    quantifying a strength of kinship between the plurality of related files based, at least in part, on a comparison between the bit-level similarity to the content level similarity with respect to a normalized numerical range for each pair of related files of the plurality of related files;
    establishing a kinship relationship between a first file of the plurality of related files and a second file of the plurality of related files based on the strength of kinship between the first file and the second file;
    propagating updates to the first kinship and the second kinship, the propagating comprising:
    establishing a connection between the first device and the second device;
    determining files in common between the first device and the second device to define common files;
    updating the first kinship for the common files on the first device based on updates from the second device; and
    updating the second kinship for the common files on the second device based on updates from the first device; and
    performing an operation with regard to at least one of two particular related files, the performing of the operation based at least in part on the kinship relationship between the two particular related files, the operation with regard to at least one of the two particular related files comprising facilitating smart selection, facilitating intelligent de-duplication, or facilitating data tracing.

15. A method as recited in claim 14, wherein:
    the plurality of related files are image files; and
    the content level analysis includes extracting luminance-based feature vectors from individual files of the plurality of related files.

16. A system for determining kinship between a plurality of image files, the system comprising:
a processor; and
a memory coupled to the processor, the memory storing instructions, which are executable by the processor, the instructions include instructions to:
operate as a file system monitor component configured to monitor operational commands between the plurality of image files; and
operate as a kinship capture engine component configured to:
determine an operational relationship between a first file of the plurality of image files and a second file of the plurality of image files based on the operational commands;
quantify a strength of kinship between the first file and the second file by:
applying a bit-level analysis to the first file and the second file to obtain a bit-level similarity between the first file and the second file, with the bit-level similarity obtained without considering image content of the first file and the second file, by treating the first file and the second file as bit streams and counting a number of bits in common between the first file and the second file;
applying a content level analysis to the first file and the second file to obtain a content level similarity between the first file and the second file, with the content level analysis being a separate and different process from the bit-level analysis; and
comparing the bit-level similarity from the bit-level analysis to the content level similarity from the content level analysis, the bit-level similarity being a numerical measure of similarity and the content level similarity being a numerical measure of similarity, with the bit-level similarity and the content level similarity normalized with respect to a common numerical range; and
establish a kinship relationship between the first file and the second file based on the strength of kinship; and
facilitate smart selection, intelligent de-duplication, or data tracing based on one or more kinship relationships between the plurality of image files.

17. A system as recited in claim 16, wherein the instructions include instructions to operate as a kinship service engine configured to process commands from third party applications relating to the kinship relationship between the first file and the second file.

18. A system as recited in claim 16, the memory further storing a kinship database configured to store data relating to the kinship relationship.

19. A system as recited in claim 16, wherein the instructions include instructions to operate as a kinship propagation manager configured to monitor signal channels to other systems to maintain cross-system kinship relationships.

* * * * *